(No Model.)

F. C. IHDE.
BELT-COUPLING.

No. 423,769. Patented Mar. 18, 1890.

Witnesses
J. Edw. Maybee
H. G. McMillan

Inventor
Fredrick C. Ihde
by Donald C. Ridout & Co.
Attys

UNITED STATES PATENT OFFICE.

FREDRICK C. IHDE, OF TORONTO, ONTARIO, CANADA, ASSIGNOR TO PETER RYAN, OF SAME PLACE.

BELT-COUPLING.

SPECIFICATION forming part of Letters Patent No. 423,769, dated March 18, 1890.

Application filed June 27, 1889. Serial No. 315,736. (No model.)

*To all whom it may concern:*

Be it known that I, FREDRICK CHARLES IHDE, tailor, of the city of Toronto, in the county of York, in the Province of Ontario, Canada, have invented a certain new and Improved Coupling for a Belt for the Transmission of Power, of which the following is a specification.

The object of this improvement is a coupling for belts for the transmission of power; and it consists in such a construction of the coupling as to adapt it to be used with a belt formed of spirally-coiled wire, and is designed to form a perfectly smooth joint with said belt and be readily united therewith or removed therefrom, as hereinafter more particularly described and then definitely claimed.

Figure 1:
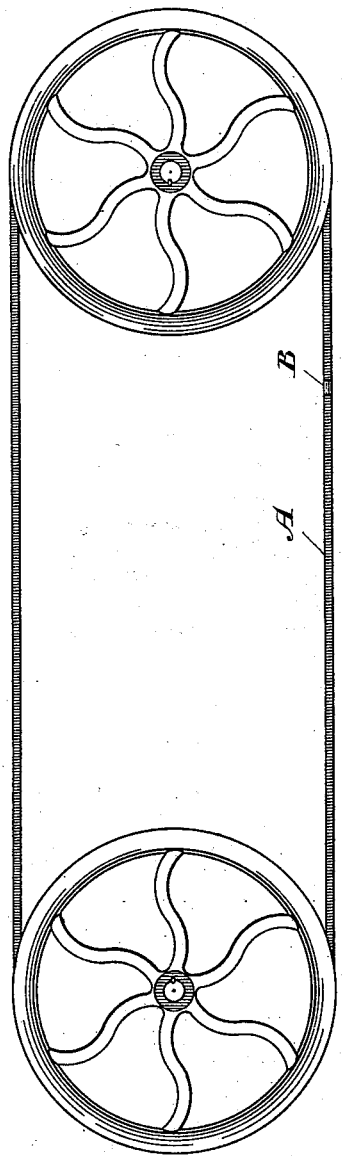
Figure 2:
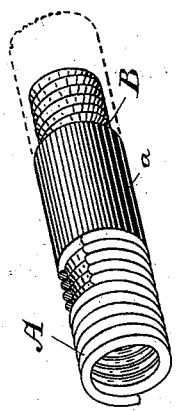

Figure 1 is a view of a belt carried around two grooved pulleys provided with my improvement. Fig. 2 is an enlarged detail showing the form of my coupling and one end of the belt used therewith.

A represents a closely-wound coil of spring-wire, which may be made any suitable length, diameter, and weight of wire, and its ends connected together by my coupling B. This coupling I make in the shape indicated in the drawings—that is to say, the body portion of it (marked $a$) will be the same diameter as the outer diameter of the coiled wire A, while its ends are turned down and screwed to fit into the center of the coil.

A belt of this description will, owing to its elasticity, always hug the pulleys around which it is carried, and as its entire surface, including the joint where the ends are connected, is perfectly even and regular, the belt will run with perfect smoothness.

The pulleys should be covered with cotton cloth or similar material.

What I claim as my invention is—

As an improved article of manufacture, a coupling for coiled-wire belts, formed of a body $a$ of the size of the belt it is to be used with, and provided with screw-threaded ends of reduced size and constructed to be screwed into the end coils of a spiral-wire belt, substantially as described.

Toronto, February 15, 1889.

FREDRICK C. IHDE.

In presence of:—
 CHARLES C. BALDWIN,
 W. G. MCMILLAN.